United States Patent

[11] 3,611,306

[72] Inventors Earl W. Reigel
Exton;
Harvey W. Bingham, Wayne, both of Pa.
[21] Appl. No. 796,779
[22] Filed Feb. 5, 1969
[45] Patented Oct. 5, 1971
[73] Assignee Burroughs Corporation
Detroit, Mich.

[54] MECHANISM TO CONTROL THE SEQUENCING OF PARTIALLY ORDERED INSTRUCTIONS IN A PARALLEL DATA PROCESSING SYSTEM
6 Claims, 4 Drawing Figs.

[52] U.S. Cl. .......... 340/172.5
[51] Int. Cl. .......... G06f 9/18
[50] Field of Search .......... 235/157; 340/172.5

[56] References Cited

UNITED STATES PATENTS

| | | | |
|---|---|---|---|
| 3,229,260 | 1/1966 | Falkoff | 340/172.5 |
| 3,343,135 | 9/1967 | Freiman et al. | 340/172.5 |
| 3,346,851 | 10/1967 | Thornton et al. | 340/172.5 |
| 3,391,390 | 7/1968 | Crane et al. | 340/172.5 |
| 3,440,611 | 4/1969 | Falkoff et al. | 340/172.5 |
| 3,470,540 | 9/1969 | Levy | 340/172.5 |

*Primary Examiner*—Paul J. Henon
*Assistant Examiner*—Melvin B. Chapnick
*Attorney*—Carl Fissell, Jr.

ABSTRACT: Apparatus is disclosed which controls the sequencing of partially ordered instructions in a parallel processing system and permits initiation of instructions as soon as all predecessor instructions have been executed. The device is asynchronous in the sense that there is no inessential fixed order of instruction initiation and the sequencing control is independent of variable instruction duration. The partial order information used by the mechanism is represented in Boolean matrix form. A brief description is also included of methods for the automatic detection of parallelism in programs, within and between statements, and the resulting partial order information as it relates to the mechanism. The operation of the mechanism in a parallel processing system is also described.

PATENTED OCT 5 1971 3,611,306

INVENTORS.
EARL W. REIGEL
HARVEY W. BINGHAM
BY
Edward J. Feeney Jr.
ATTORNEY

INVENTORS.
EARL W. REIGEL
HARVEY W. BINGHAM
BY Edward J. Feeney Jr.
ATTORNEY

INVENTORS.
EARL W. REIGEL
HARVEY W. BINGHAM
BY
Edward J. Feeney Jr.
ATTORNEY

INVENTORS.
EARL W. REIGEL
HARVEY W. BINGHAM
BY Edward J. Feeney Jr.
ATTORNEY

MECHANISM TO CONTROL THE SEQUENCING OF PARTIALLY ORDERED INSTRUCTIONS IN A PARALLEL DATA PROCESSING SYSTEM

BACKGROUND OF THE INVENTION

1. Field of the Invention

The invention relates generally to parallel data-processing systems and the detection and control of parallelism within the programs executed by said systems. More particularly, it relates to a control device which operates in conjunction with means for detection of parallelism. The detection of parallelism is accomplished during the compilation phase before execution of the program begins. The detection of parallelism within an arithmetic or logic expression has been reported by H. Hellerman, "Parallel Processing of Algebraic Expressions," IEEE TEC 15, 1, pp. 81–91, Feb. 1966 and by J. S. Squire, "A Translation Algorithm for a Multiprocessor Computer," Proc. 18th A.C.M. Nat. Conf., Denver, Colo., 1963. Briefly the procedure is as follows:

1. The expression is transformed into an equivalent operator prefix Polish string with the property of having minimum depth = min. [max. (number of consecutive operators)]. For example, the expression *(a+b+c+d)*e*f*   **++ab+cd*ef* (and not ***+++abcdef*).

2. The resulting string is then inspected for all *n*-ary operators for which the next *n* positions represent operands. In the example *+ab* and *+cd* and **ef* are the operators. These instructions (operator and operands) are then grouped to be executed at the same level.

3. The instructions so formed are then replaced with a resulting temporary operand **++ab+cd*ef*   *+$T_1T_2T_3$.

4. These last two steps are then repeated until all operators are exhausted. This results in a grouping of instructions to be executed at each level of the "tree."

An algorithm and its implementation will now be set forth for the automatic detection of parallelism.

The detection of parallelism between statements is based on input/output set intersections as developed by H. Bingham, E. Reigel and D. Fisher in the publication entitled "Automatic Detection of Parallelism in Computer Programs," AD662 274, Nov. 1967, TR TECHNICAL REPORT (TR)—ARMY ELECTRONIC COMMAND (ECOM)—02463–04. A similar publication by H. Bingham and E. Reigel is entitled "Parallelism in Computer Programs and Multiprocessing Machine Organizations," TECHNICAL REPORT (TR)—ARMY ELECTRONIC COMMAND (ECOM)—02463–5, Jan., 1968. The algorithm is basically as follows:

1. From statement outputs, initial statement order, and the given essential order (statements in one but not both branches following a conditional), the Availability Table (AVT) is obtained. The AVT is a two-dimensional Boolean array with statement outputs as the row dimension and statement numbers as the column dimension. Thus a "1" at position $(i,j)$ indicates that output $i$ is available at statement $j$.

2. From statement inputs, the Input Requirement Table (IRT) is obtained. The IRT has the same structure as the AVT. A "1" at position $(i,j)$ indicates that output $i$ is required as input to statement $j$.

3. From the conditional statements, the given essential order (ZT) is obtained.

4. The AVT and the IRT are component by component ANDed to yield the I/O Intersection Table (IT).

5. The IT and ZT are component by component ORed to yield the statement partial order matrix (IZT).

2. Description of the Prior Art

There are no known hardware mechanisms to control sequencing of partially ordered events, at the level described here, in a general purpose parallel processing system. Most simply the level set forth here may be described as the machine instruction level. The exploitation of parallelism has been either at a higher level (i.e. between segments of programs containing groups of instructions) or at a lower level which exploits data parallelism inherent in a certain class of problems (i.e., special purpose parallel processing systems).

In a parallel processing system which exploits parallelism between groups of instructions, special language constructs such as "FORK and JOIN" as described in M. Conway, "A Multiprocessor System Design," AFIPS PROC. FJCC, 1963, are proposed for use by the programmer to explicitly express the parallelism (rather than automatic detection means) and the sequencing is performed by software methods.

The comparable mechanism used in serial computing systems has been a simple "instruction counter" with incrementing capability for normal sequencing and setting capability for transfer of control. A hardware mechanism called "SCOREBOARD" used in the CDC 6600 computing system is described in J. E. Thornton, "Parallel Operation in the Control Data 6600," AFIPS PROC F JCC, Vol. 26, Part II 1964. This mechanism allows several independent chains of instructions to proceed concurrently.

SUMMARY OF THE INVENTION

The present invention provides a mechanism for controlling the sequencing of partially ordered instructions in a parallel data processing system. The mechanism is shown in conjunction with a suggested parallel processing system. Generally the parallel processing system comprises processing units, sequencing units, high and medium speed storage, including block oriented random access memories and secondary storage. Further a resource manager controls the allocation of the processing and sequencing units, while a memory manager controls storage allocation. The control mechanism itself operates in conjunction with a means for supplying a set of instructions to be executed and the necessary sequencing information. A Boolean matrix, produced by the detection algorithm, contains the precedence information necessary for the sequencing control. The Boolean matrix is composed of a plurality of flip-flops arranged in a two dimensional matrix of rows and columns. It defines binary "1's" and "0's," where a "1" in the matrix represents an ordering between two processes. The two processes are related to the rows and columns of the matrix. This matrix and a plurality of associated Boolean vectors comprise the control mechanism.

It is therefore an object of the present invention to provide apparatus for controlling the sequencing of partially ordered events in a parallel processing system.

It is also an object of this invention to provide such control apparatus in which the mechanism is asynchronous in the sense that there is no inessential fixed order of instruction initiation and the sequencing control is independent of variation in instruction duration.

It is still a further object of the present invention to provide a sequencing mechanism for controlling partially ordered events in which the partial ordered information used by the mechanism is represented in Boolean matrix form.

It is also an object of the present invention to disclose this mechanism in conjunction with means for automatically detecting parallelism in programs, within and between statements, and to provide a system which illustrates the operation of the mechanism in a parallel processing system.

These and other objects will become apparent upon consideration of the remainder of this specification with the accompanying drawings. Specific embodiments, contemplated by the inventors to be the best mode of carrying out their invention, are set forth in the following detailed description.

DESCRIPTION OF THE PREFERRED EMBODIMENT

Figure 1:
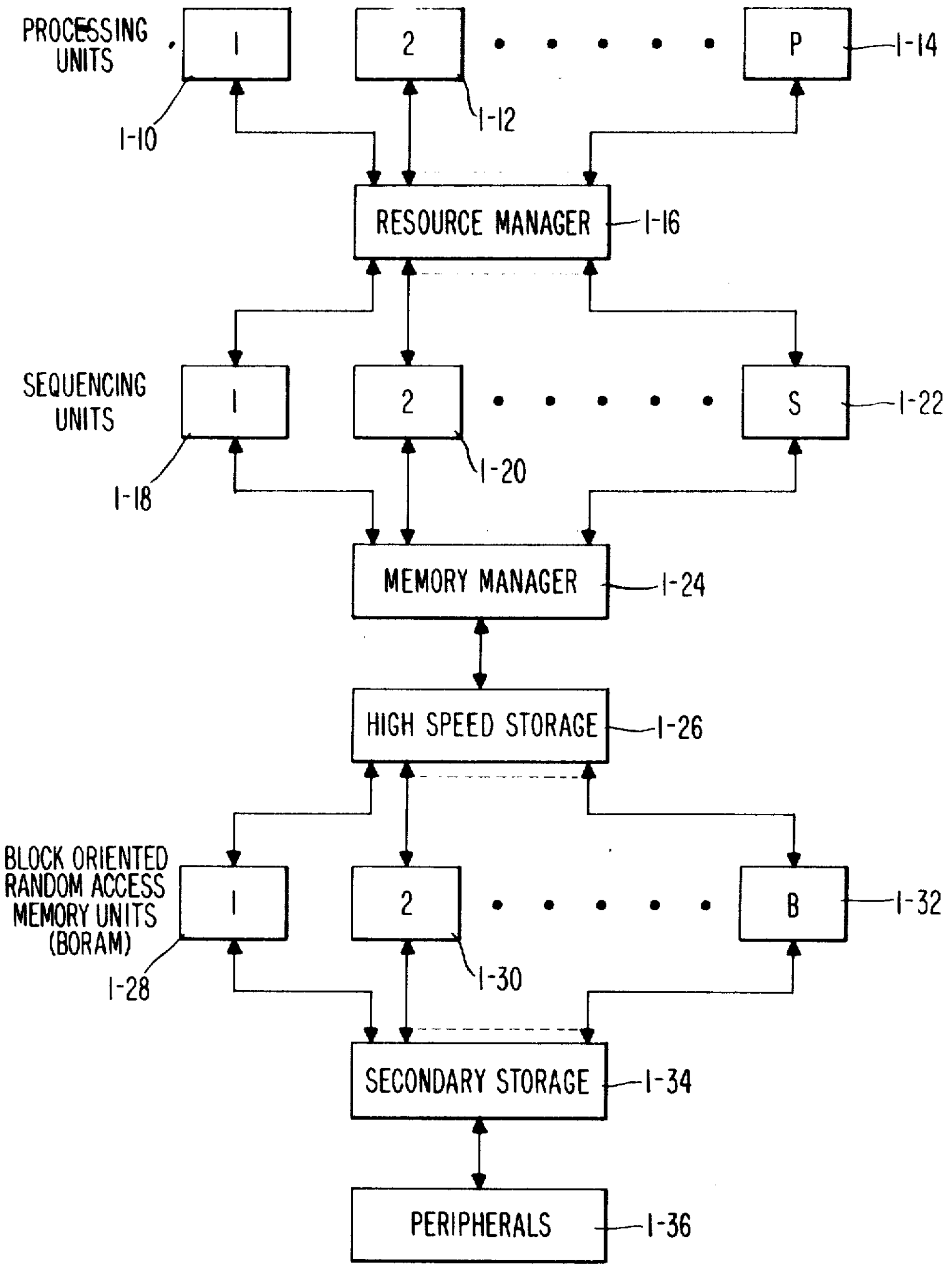
FIG. 1 is a block diagram of a proposed parallel processing system which might utilize this invention.

The parallel processing system as shown in FIG. 1 comprises a plurality of processing units 1–10, 1–12, 1–14 coupled via a resource manager 1–16 to a plurality of sequencing units 1–18, 1–20, 1–22. The resource manager 1–16 controls the allocation of the processing units and the sequencing units. Thus, it is an interconnection control mechanism which connects one of the processing units 1–10, 1–12, 1–14 which contains a segment to be initiated with the next available sequencing unit.

The concepts of resource managing is basically one wherein a control unit, such as the resource manager 1–16, maintains a stored record of the processing units 1–10, 1–12, etc. available for work on programs stored in the system memory. In the present instance it monitors what units are available and selectively interconnects appropriate processing units with appropriate sequencing units. For example, the concept has been described and explained in a number of publications such as the one by Anderson, J. P., Hoffman, S. A., Shifman, J., and Williams, R. J.: D–825 A Multiple Computer System for Command and Control. *AFIPS Conference Proceedings*, 22:86 (FJCC) 1962. Other publications are Coffman, E. G., Stochastic Models of Multiple and Time-Shared computer Operations. UCLA–66–38, AD636976 (June 1966) and Codd, E. F.: Multiprogram Scheduling. *Comm. A.C.M.*, 3,6:347, June 1960. Further issued patent examples of the Memory Manager 1–24 are U.S. Pat. No. 3,482,264 entitled "Data Processing System Including Communication Priority and Priority Sharing Among Subsystems," U.S. Pat. No. 3,482,265 entitled "Data Processing System Including Means for Awarding Priority to Requests for Communication," both issued to R. Cohen et al. They both show and describe a Memory Controller 7 which corresponds to the Memory Manager 1–24 of the present system. Similarly, a scratch pad memory such as the High Speed Storage unit 1–26 of the present application is shown and described in U.S. Pat. No. 3,319,226 issued to L. Mott et al. and entitled "Data Processor Module for a Modular Data Processing System for Operation with a Time-Shared Memory in the Simultaneous Execution or Multi-Tasks and Multi-Programs." More specifically, such a memory is shown in FIG. 1A and referenced 3001. The Secondary Storage 1–34 and the Peripherals 1– 36 of this application are set forth in many patents. For example, they are shown and described in U.S. Pat. No. 3,274,561 issued to H. R. Hallman et al. and entitled "Data Processor Input/Output Control System." More specifically, the Secondary Storage 1–34 may be the Main Memory 100 shown in FIG. 1A of the patent as well as the Disk Bulk Storage Device (BS) referenced generally as 701/702 of the same Figure and the Magnetic Tape Units (MT) shown in the same place. The peripherals cover the entire block referenced in the same patent as 700 in FIG. 1. Additional patents showing and describing such storage and peripheral devices are U.S. Pat. No. 3,274,554 issued to W. W. Hopper et al. and entitled "-Computer System"; U.S. Pat. No. 3,492,654 issued to W. C. Fresch et al. entitled "High Speed Modular Data Processing System" and U.S. Pat. No. 3,548,382 issued to I. F. Lichty et al. entitled "High Speed Modular Data Processing System Having Magnetic Core Main Memory Modules of Various Storage Capacities and Operational Speeds." In addition, a memory manager 1–24 controls the allocation of memory space in a high speed storage means 1–26 and in the Block Oriented Random Access Memory (BORAM) units 1–28, 1–30, 1–32. The memory manager 1–24 is a memory control unit which assigns storage space in the memory hierarchy including the high speed memory 1–26, the BORAM units 1–28, 1–30 and 1–32, the slower secondary storage 1–34 or the peripheral devices 1–36. Memory is a significant factor in determining the information flow in a system. Therefore, this resource must be carefully considered in any system design and tradeoffs between speed and cost must be made. As a result of these tradeoffs, system memory has evolved into a hierarchical structure. There are usually several levels of memory in the hierarchy. Associated with each level are the characteristics of access (or latency) time, cycle time or transfer rate, sizes of blocks transferred, and cost (usually represented on a per bit basis).

The lower the level of memory, the faster its speed and the higher its cost. Five levels of memory will be discussed.

Level 0 memory is considered to operate at the clock rate of the system and is of highest cost. The registers in the processing units 1–10, 1–12 —— 1–14 correspond 12–this level. Semiconductor memories provide capability for larger capacities at this level. For examples, the IBM 360/85 uses a high speed buffer called "cache" local to the processor, and the Project Genie system, uses a high speed buffer storage with each level 1 memory. The next two levels may also be included in this category.

Level 1 memory is usually composed of magnetic cores or thin films and operates at cycle times approximately 10 system clock times. This level would be the category shown as High Speed Storage 1–26. It dominates system cost since it is both high in cost and of large capacity.

Level 2 memory is also composed of magnetic cores or thin films but the costs are lower than level 1. The speeds are also lower, perhaps 25 system clock times. The structure of these memories and their lower circuit costs (because of reduced speed) cause this level to be of lower cost than level 1. The physical words are composed of more bits; therefore, for the same memory capacity, fewer words (and associated circuits) are needed. Data is accessed in blocks of logic words.

Level 3 is typified by the traveling domain wall-block oriented random access memory (TDW–BORAM) illustrated in FIG. 1 as 1–28, 1–30, 1–32 and developed by Burroughs Corporation. Information is stored in blocks of perhaps 128 words and access to a block is serial by word and involves approximately 5 μsec. latency time (time to access first word) and a 200 nsec./word transfer rate (time between successive words).

Level 4 is generally a disk system or perhaps a drum or some other peripheral device as categorized in FIG. 1 as Peripherals, 1–36. The information stored in this level memory is also by block with typical latency time of 20 msec. and transfer rate of 40 μsec./word. The BORAM units are envisioned herein as random access memories wherein each memory location provides a storage capacity of a plurality of system words. Such memories are well known in the art and are referred to as BORAM memories by those knowledgeable in this area. A possible TDW–BORAM configuration includes a stack of 64 planes. Each plane contains 64 blocks of 4,096 bits. The storage medium for TDW–BORAM is a magnetic film without discrete spots. Parallel to this memory film is the TDW film in which a magnetic domain wall can exist between two regions having opposite directions of magnetization.

The domain wall can be launched at an end in the TDW film and can be used to travel with a controlled velocity to the other end. The induced field around the TDW causes a sufficient disturbance in the nearby region of the memory film to enable the bits stored there to be sensed on sense lines that are placed perpendicular to the domain wall. Many sense lines can share the same TDW. Reading is nondestructive and writing takes the same time as reading. After either a read or a write, however, the domain wall must be restored in a getback cycle before the same block may be accessed again. The getback cycle takes a time comparable to the read or write time. Access to a block in any other plane may co-occur with getback.

An example of such a BORAM memory is disclosed in a pair of patents issued to the assignee of the present application, entitled "Block Oriented Random Access Memory With A Traveling Domain Wall Field," by William D. Murray et al., U.S. Pat. No. 3,483,537, and "Traveling Domain Wall Memory System Apparatus," by Philip E. Shafer, U.S. Pat. No. 3,493,946. Further the secondary storage 1–34 and the peripherals 1–36 noted in FIG. 1 are also well known in this art. Peripherals 1–36, for example, refer to input/output devices such as high speed tape units, high speed printers, punches, sorters, etc. and the secondary storage means comprises merely another level of storage capacity as is included in the usual memory hierarchy of a present day data processing system.

Figure 2:
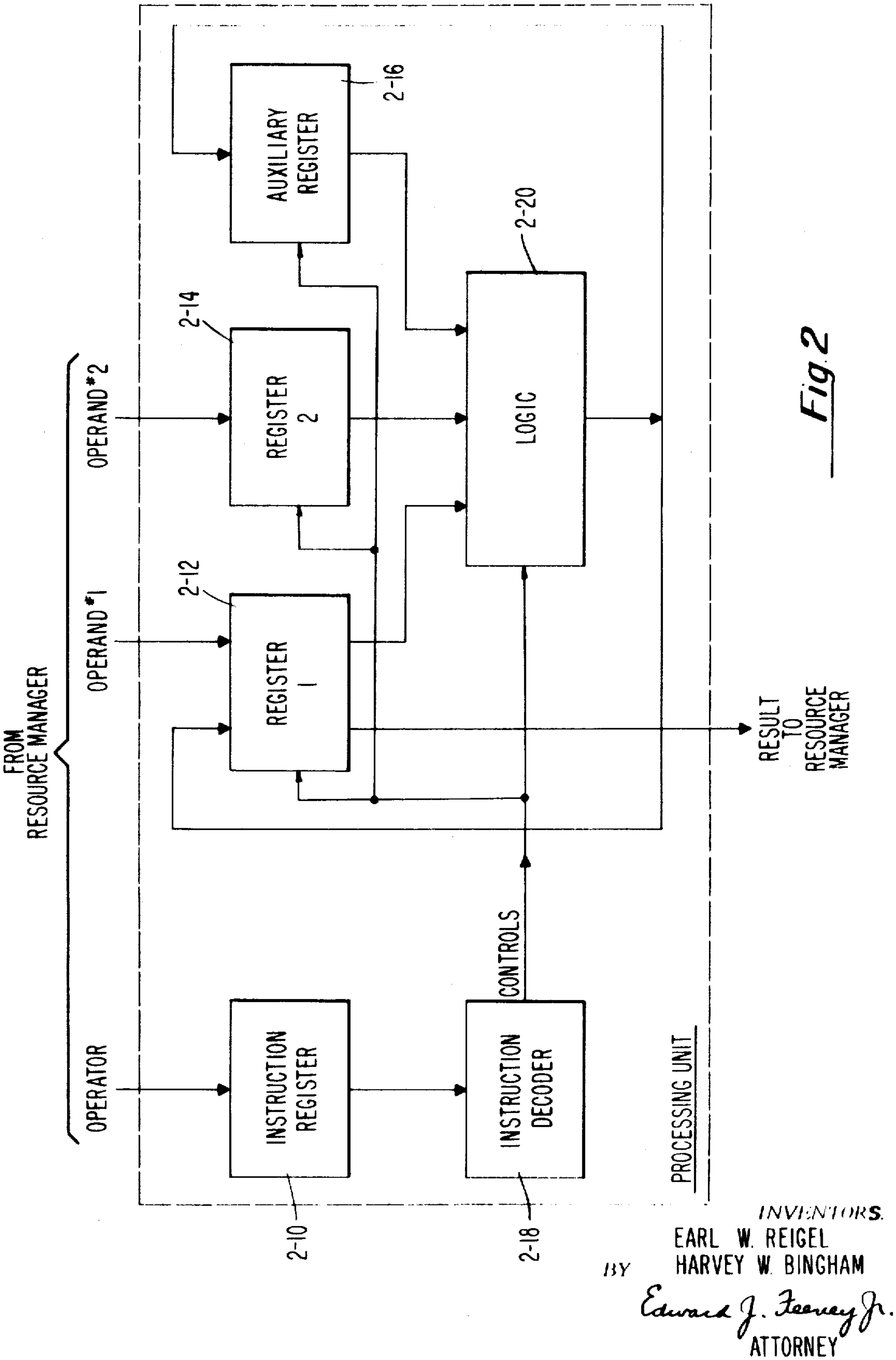
FIG. 2 is a more detailed block diagram of a processing unit illustrated generally in FIG. 1.

Next consider FIG. 2 which illustrates in detail one of the processing units 1–10, 1–12, 1–14 of FIG. 1. Processors of this type are well known in the art as three address processors.

An operator and two operands enter the unit from the resource manager. The operator signal is coupled to the instruction register 2–10, while the two operands respectively enter a first register 2–12 and a second register 2–14. An instruction decoder 2–18 receives the contents of the instruction register 2–10 and provides the necessary processing control signals for the unit. Thus, control lines are shown connecting the instruction decoder 2–18 to the Register 1, 2–12, Register 2, 2–14, the Auxiliary Register 2–16, which is used as a buffer register in the event that Registers 1 and 2 are presently being utilized and also to the logic circuitry 2–20. The operands contained in registers 2–12 and 2–14 are processed by the logical circuitry 2–20 and the resulting value is returned via the register 2–12 to the resource manager. The resource manager 1–16 (FIG. 1) determines which of the plurality of sequencing units 1–18, 1–20, 1–22 had requested the instruction to be executed and passes the result value to that unit. In summary, the processing unit of FIG. 2 receives an operator and two operand values from the resource manager. When the processing is complete, the result value is sent to the resource manager, which then forwards it to the appropriate sequencing unit. However, the operation of the processing unit is not described in detail since the method of instruction execution is flexible. For example, the instruction decoding and execution may be fixed logic or implemented through microprogramming. In any event, the detail of this unit is not necessary to the understanding and implementation of the present sequencing mechanism in a general purpose parallel processor which is described herein in detail.

Figure 3:
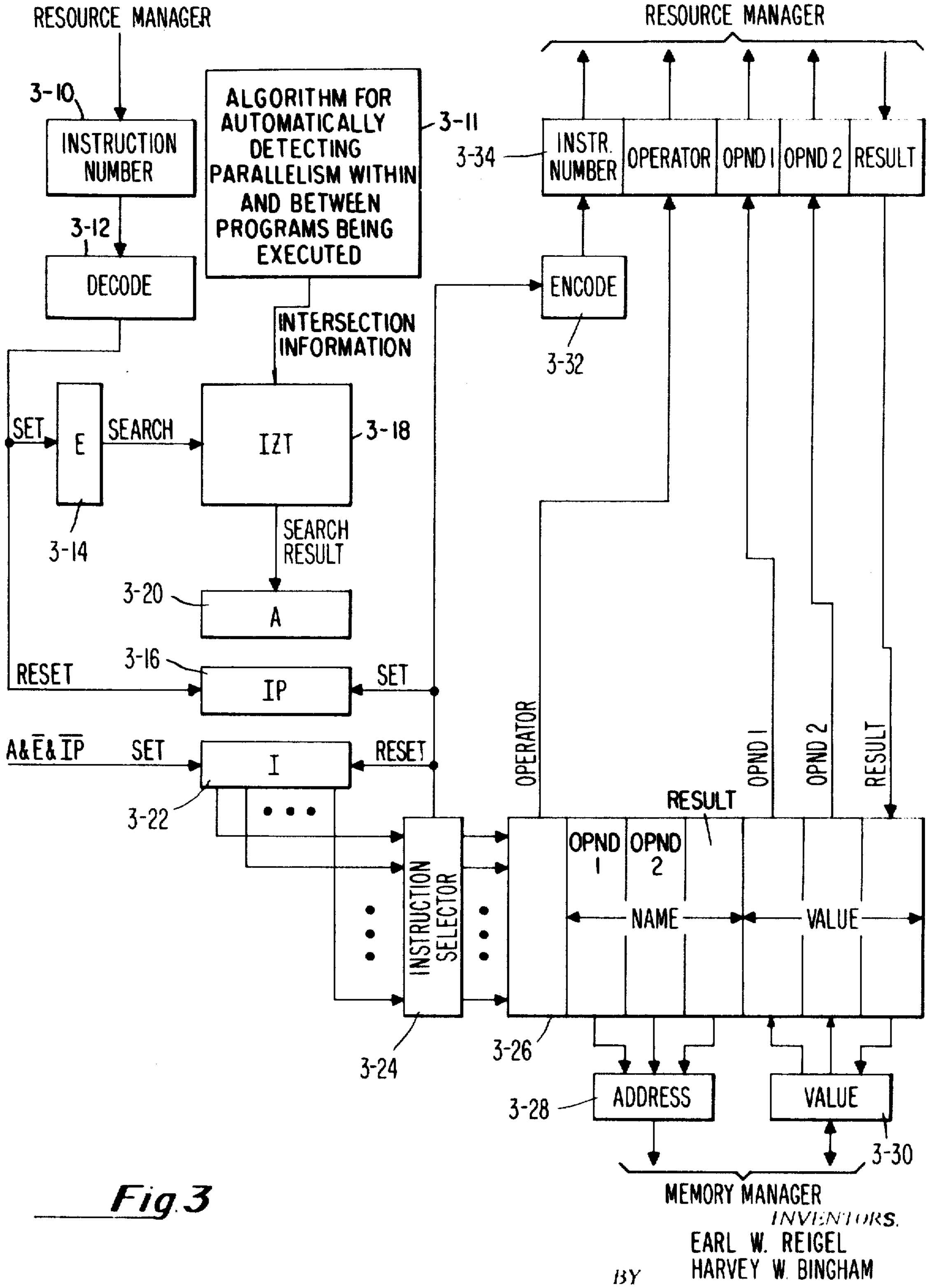
FIG. 3 is also a block diagram which illustrates a sequencing unit of FIG. 1 in greater detail.

FIG. 3 is a detailed block diagram of such a sequencing unit. Information from the resource manager enters an instruction number register 3–10 and upon decoding 3–12 is sent to an Executed (E) register 3–14 to set selected elements of the register. Simultaneously the decoded information is also sent to an In Progress (IP) register 3–16. The information stored in the E register is then used to search the IZT matrix 3–18. This matrix is shown in more detail in the upper portion of FIG. 4 and is so indicated by the dashed box enclosing the matrix. This matrix provides the intersection/given essential order relationship and is a composite (logical union) of the intersection relation (IT) that indicates the potential data paths and the given essential order relationship (ZT) that indicates the condition paths of control.

It is understood that this IZT matrix is in the configuration of a flip-flop memory array and that a simultaneous search feature is inherent in this matrix. This array is shown in detail in the upper dashed portion of FIG. 4. Thus, this IZT matrix 3–18, the information for which is produced by the previously described detection algorithm, and shown as emanating from such algorithm for automatically detecting such parallelism 3–11, is a Boolean matrix that contains the precedence information necessary for the sequencing control.

The search result from the IZT matrix is represented on the Allowable (A) Signal Lines 3–20. Vector A is the combined logical outputs of inverters 4–58, 4–60——4–62. It is logically created from the OR'd outputs of the IZT matrix. The combined outputs from the respective OR gates create the vector A. As a result of the search, certain bits of the Initiate (I) register 3–22 receive set signals ($A\&\overline{E}\&\overline{IP}$) which indicate that the associated instructions are allowable (A) AND are "not" already executed ($\overline{E}$) AND further are "not" in progress ($\overline{IP}$). The source of these signals, namely, A & E and $\overline{IP}$ is more clearly shown in the lower portion of FIG. 4. Thus, the $\overline{IP}$ signals originate from flip-flops 4–64, 4–66 and 4–68, the A signals arrive from the inverters 4–58, 4–60 and 4–62 while the E signals originate from the IZT matrix. It is therefore believed readily apparent from FIG. 4 wherein the respective signals originate to set and reset the various registers. The contents of the initiate register 3–22 is sent to the Instruction Selector Register 3–24. Certain bits of the initiate register 3–22 are thereafter reset while those in the IP register 3–16 are set.

The sequencing unit controls the sequencing of instructions and allows the exploitation of instruction parallelism. When a segment of program is to be executed, the resource manager chooses an available sequencing unit. The set of instructions (three-address) to be executed and the order control information is then sent to the chosen unit.

The set of three-address instructions is stored in the instruction list section of the sequencing unit in the four fields: operator, operand 1, operand 2, and result. The operand and result fields contain name information. Associated with each instruction is a corresponding set of three fields (two operand and one result) for containing the value information.

Figure 4:
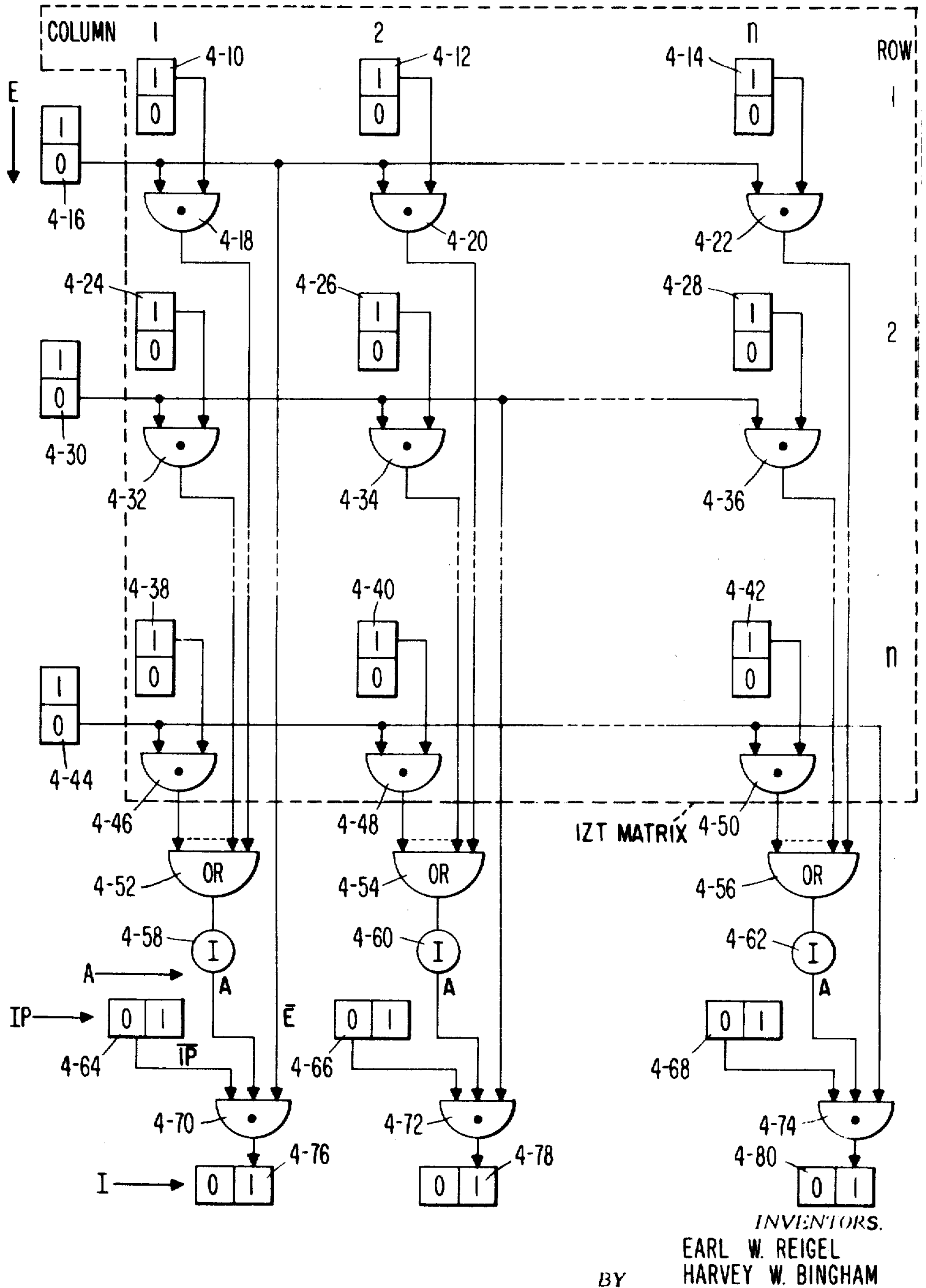
FIG. 4 is a logical diagram of the mechanism which controls the sequencing of partially ordered events.

The operation will now be described in more detail in conjunction with FIGS. 3 and 4.

Consider a program or a segment of a program of $n$ processes or instructions (numbered 1,2...,$n$). Assume that the IZT matrix of $n$ rows and $n$ columns is stored in a flip-flop array of FIG. 4 and that there are available four Boolean vector registers (E, IP, A and I) each of length $n$. Thus, the IZT matrix (enclosed by the dashed line box) is comprised of a plurality of flip-flops. For example, flip-flops 4–10, 4–12——4–14, comprise Row 1 of the matrix, while flip-flops 4–10, 4–24,——4–38, comprise Column 1 of the matrix. The E register is comprised of flip-flops 4–16, 4–30,——4–44. The respective outputs from the Row 1 flip-flops are gated (via AND gates 4–18, 4–20——4–22) with the first flip-flop 4–16 of the E register. Successive rows of the matrix are accordingly gated with successive locations (flip-flops) of the E register. The outputs from all of the AND gates of a Column 4–18, 4–32, ——4–46 are OR gated 4–52, inverted 4–58 and AND gated 4–70 with the output from a flip-flop 4–64 of the IP register. The output of the AND gate is applied to a flip-flop 4–76 of the I register. The representation A is now shown in FIG. 4 as being the output logic signals from the respective inverters 4–58, 4–60,——4–62. Thus, the $j$th bit of the set of logic signals A can be set by simultaneous activation of any flip-flops in the $j$th column of the IZT matrix with an associated flip-flop of the E register. Any bit set within the IZT matrix and the four vectors is to be interpreted as follows:

IZT: A bit set to "1" at row $i$, column $j$ means that process $i$ must precede process $j$ in execution. In addition to providing the precedence information for sequence control, the IZT matrix also provides information for passing of operand values. A bit set at position $(i,j)$ also is interpreted as: the output of instruction $i$ is to be used as an input to instruction $j$.

The $j$th set to "1" means that process $j$ has been executed. (column vector)

IP: The $j$th bit set to "1" means that process $j$ is in progress (being executed). (row vector)

A: The $j$th bit "set" means that process $j$ is allowed (i.e. process $j$ is not waiting for any other process to be completed. (row vector) As shown in FIG. 4, A is not a set of flip-flops but a set of logic signals.

I: The $j$th bit set to "1" means that execution of process $j$ may be initiated. (row vector)

When a segment of program is to be executed, the resource manager chooses an available sequencing unit. A set of instructions (three address in this configuration) is then sent to the chosen sequencing unit. In addition, sequencing information for use by the IZT matrix is also sent to the chosen unit.

When a set of instructions and the associated IZT matrix information is sent to a sequencing unit, the E, A, IP and I vectors are rest to "0." The E vector indicates the instructions which have been executed. $E_i$=0 indicates that instruction $i$ has been executed and $E_i$=0 indicates that instruction $i$ has not been executed. When a processing unit has completed an instruction the result is sent to the resource manager which forwards the result to the appropriate sequencing unit together with the instruction number associated with the instruction just completed. This instruction number (for example $i$) is decoded and the appropriate bit in E ($E_i$) is set to "1" forming the "new" E vector, and the associated bit in IP ($IP_i$) is reset to "0." Then the following two operations are performed simultaneously:

1. The $i$th row of IZT is searched for "ones." For each column which has a "1" in the $i$th row there is an instruction which requires the result value just received. This value is passed simultaneously to all positions in the instruction set which need it.

2. The "new" E vector is used to search the IZT matrix column by column (all columns simultaneously). Any column which has "0's" everywhere that E has 0's indicates an instruction which is allowable in the sense that all of its predecessors have been executed. For all columns satisfying this search, the associated bit positions (logic signals) in vector A are "set." All instructions whose bit in A is "set" and bit in E is reset (not been executed yet) and IP bit is reset (not in progress) are initiable and hence their I bit is set (i.e. $A\&\bar{E}\&\overline{IP}\rightarrow I$). A more detailed algorithm for this step is now stated.

The following steps will produce the next set of processes that are ready for execution:

1. When process $j$ execution is completed, set the associated bit position $E_j$ in the vector E and reset the corresponding bit $IP_j$ in the in-progress vector IP.

2. If every position of the E vector is set (all processes have been executed), then exit the procedure.

3. If the process just executed is a conditional, then all processes in the branch not chosen are made to appear to have been executed.

a. Construct a temporary search vector with search criteria "reset" in the process position associated with the chosen branch of the conditional, and "set" in the process position of the branch not chosen.

b. Search for a match in the rows of IZT corresponding to these two positions (masking all other positions). This produces a vector A which has a bit set in the positions corresponding to processes that are exclusively in the branch not chosen.

c. OR vector A (from 3$b$) with the vector E and store into E. In addition, set in E the two positions following the conditional. (If $j$ is the conditional, then set $E_{j+1}$ and $E_{j+2}$, the alternative path heads).

4. Using the reset positions of vector E, search the IZT flipflop array for columns whose row positions are reset everywhere that vector E is reset. A process whose column satisfies the search criterion is considered to be allowed since all of its predecessor processes have been executed. This search produces a vector A of allowed processes. The output A is a vector indicating the set of processes that are not waiting for any other process to be completed. However, this also includes all processes already executed and all processes presently in progress.

5. For each process position $j$, if $E_j$ is reset ($j$ not executed) and IP is reset ($j$ is not in progress) and $A_j$ is "set" ($j$ is allowable), then set $I_j$. The resulting vector I now indicates the set of processes that may be executed next.

6. The vector I produced by step 5 may then be used to retrieve from the list of all processes the subset ready for initiation of execution.

7. When process $j$ is actually initiated, $IP_j$ is set, and $I_j$ is reset.

When the I bit of an instruction is set, the associated operator and two operands are sent to the resource manager with the instruction number, the I bit is reset and the IP bit is set. If more than one instruction is initiable, the instructions are sent in sequence with the lower numbered instruction first. These instructions are queued in the resource manager awaiting available processing units. Thus, generally, the sequencing unit queues instructions in the resource manager. However, if it were desired to add a queueing means to the right-hand portion of the sequencing unit of FIG. 3, then, of course, the sequencing could also be accomplished there. The various bits noted are set and reset by the output signals from the instruction selector unit 3–24. The flip-flops set and reset are shown in FIG. 4. For example, the I register includes flip-flops 4–76, 4–78 and 4–80. They are respectively set by the outputs from AND gates 4–70, 4–72 and 4–74, while they are reset by the instruction selector unit 3–24 after the instruction is initiated.

In addition to sequencing the instructions, the sequencing unit also initiates the fetching and storing of operands. Associated with each input operand name is a fetch bit which when set indicates that the operand value is to be fetched and when reset indicates that the value is generated within the segment and will be inserted when the result value is received (as explained earlier.)

Therefore all operands whose fetch bit is set require a fetch of the operand value from memory. The operand name is sent to the memory manager which checks (using associative memory) for its presence in high speed memory. If it is present, the value is sent to the sequencing unit. If not present, the memory manager requests that it be sent to high speed memory from the Boram memory. In this case, a block of information in high speed memory must be written out to BORAM to make space available for the new block. The block to be replaced is chosen by an appropriate replacement algorithm (e.g. longest unreferenced block.

Associated with each result name is also a bit which when set indicates that the result value is to be stored, and when reset indicates that the value is a temporary result and is only used within the segment being executed. When the bit is reset, no store is made to memory, and when set a store is required. The action taken on a store operation is similar to that of the fetch. Both the fetch and store operations may be performed concurrently with execution of instructions within the segment.

When a segment is completed, whether by execution of all instructions or by early termination because of a conditional, the next segment is initiated using a special instruction. This instruction with the name of the segment to be initiated is sent to the resource manager. This request is put in the segment queue and waits for an available sequencing unit.

What has been shown and described is a mechanism for controlling the sequence of partially ordered instructions in a parallel processing system.

Obviously many modifications and variations of the present invention are possible in the light of the above teachings. It is therefore to be understood that within the scope of the appended claims, the invention may be practiced other than as specifically described and illustrated.

We claim:

1. A sequencing control unit for use in a parallel processing system with algorithmic means for automatically determining the presence of parallelism within and between statements of programs being executed by the processing system and means in association with said algorithmic means for providing output signals denoting incidents of such parallelism, said sequencing control unit comprising matrix means for indicating the presence of said parallelism and connected to receive the output signals of the output means, and a plurality of vector registers coupled to said matrix for applying individually and solely each of the following vectors: executed vectors to simultaneously search the stored contents of said matrix means; initiation vectors to initiate the processing of a further instruction within those programs being executed by the processing system when all predecessor instructions have been executed; in progress vectors for preventing initiation of a further instruction within those programs being executed by the processing system while a previous one is being executed; and allowable vectors for indicating the results of a simultaneous search of said matrix.

2. The sequencing unit as set forth in claim 1 wherein there is additionally included a further plurality of program statement registers coupled to the initiate vector register via an instruction selection register, said further plurality of registers storing the names and the values of the statements of the statements of the programs to be initiated by said initiate vector register.

3. A system for controlling the sequencing of partially ordered instructions in a parallel processing system comprising means for automatically detecting parallelism in the programs being executed by said processing system, matrix storage means for simultaneously storing the output signals from said detection means and thereby representing the output therefrom, an executed vector register connected to said matrix storage means for simultaneously searching the contents thereof, an allowable vector of signal lines connected to said matrix storage means for receiving the results of said simultaneous search, an in progress vector register further coupled to said matrix storage means for preventing reinitiation of an instruction contained in the programs being executed by the processing system that is already being processed, and an initiation vector register also coupled to said matrix for initiating the processing of further instructions also contained in said programs when all predecessor instructions have been executed.

4. The system as set forth in claim 3 wherein said matrix storage means is a Boolean matrix having $n$ rows and $n$ columns wherein said Boolean matrix is a two dimensional array of bistable elements representing binary "1's" and "0's" with a binary "1" representing an ordering between the two processes represented by the rows and columns of said matrix and each of said executed, allowable, in progress and initiation registers store Boolean vectors $n$ bits in length and the allowable vector is a Boolean set of logic levels derived from these registers.

5. A parallel processing system capable of controlling the sequencing of partially ordered instructions said processing system including means for automatically detecting and indicating parallelism in the programs being executed by said processing system said processing system including further means comprising Boolean matrix means connected to said detection means for simultaneously storing information corresponding to indications of parallelism from said detection means, an execution register connected to said matrix means for simultaneously searching the contents of said matrix means, a source of an allowable set of logic signals derived from said matrix means for representing the results of said simultaneous search, an in progress register further coupled to said matrix means for preventing initiation of a further instruction within those programs being executed by the processing system while a previous one is being processed and an initiation register also coupled to said matrix for initiating the processing of a further instruction within those programs being executed by the processing system when all predecessor instructions have been executed.

6. A method for the detection of parallelism based on input/output set intersections between statements of programs being executed on a data processing system by providing a partial order statement matrix, said method comprising the steps of obtaining a table of availability from statement outputs, initial statement order and given essential order said table being a two dimensional Boolean array with statement outputs as the row dimension and statement numbers as the column dimension, such that a binary 1 at position $(i,j)$ of the table indicates that output $i$ is available at statement $j$; next from statement inputs obtain an input requirement table similar to the availability table, such that a binary 1 at position $(i,j)$ of the input requirement table also indicates that output $i$ is required as an input to statement $j$; next, obtain the given essential order from the conditional statements; thereafter AND gate together, intersection by intersection, the availability table and the input requirement table, to provide an input/output statement intersection table; and finally OR gate together, the corresponding elements of the input/output statement intersection table and the given essential order to provide the partial order statement matrix.